(12) United States Patent
Noh et al.

(10) Patent No.: US 11,395,281 B2
(45) Date of Patent: *Jul. 19, 2022

(54) METHOD AND APPARATUS FOR TRANSMITTING REFERENCE SIGNAL IN WIRELESS COMMUNICATION SYSTEM

(71) Applicant: LG ELECTRONICS INC., Seoul (KR)

(72) Inventors: Min Seok Noh, Anyang-si (KR); Moon Il Lee, Anyang-si (KR); Jae Hoon Chung, Anyang-si (KR); Sung Ho Moon, Anyang-si (KR); Seung Hee Han, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 248 days.

This patent is subject to a terminal disclaimer.

(21) Appl. No.: 16/750,590

(22) Filed: Jan. 23, 2020

(65) Prior Publication Data

US 2020/0163065 A1 May 21, 2020

Related U.S. Application Data

(63) Continuation of application No. 16/023,737, filed on Jun. 29, 2018, now Pat. No. 10,582,483, which is a
(Continued)

(51) Int. Cl.
*H04J 3/00* (2006.01)
*H04W 72/04* (2009.01)
(Continued)

(52) U.S. Cl.
CPC ........ *H04W 72/042* (2013.01); *H04B 7/0626* (2013.01); *H04J 3/00* (2013.01);
(Continued)

(58) Field of Classification Search
CPC ............ H04W 72/042; H04W 72/0406; H04B 7/0626; H04J 3/00; H04J 11/0053;
(Continued)

(56) References Cited

U.S. PATENT DOCUMENTS 7,400,609 B2    7/2008  Hammerschmidt
9,083,482 B2    7/2015  Noh et al.
(Continued)

FOREIGN PATENT DOCUMENTS

EP    2 413 516 A2    2/2012
EP    2 456 154 A2    5/2012
(Continued)

OTHER PUBLICATIONS

Alcatel-Lucent Shanghai Bell et al., "Multi-cell cooperative RS in CoMP", 3GPP TSG-RAN WG1 #58, R1-093341, Aug. 24-28, 2009, pp. 1-5.
(Continued)

*Primary Examiner* — Minh Trang T Nguyen
(74) *Attorney, Agent, or Firm* — Birch, Stewart, Kolasch & Birch, LLP

(57) ABSTRACT

A method for a user equipment (UE) in a wireless communication system, includes receiving channel state information reference signal (CSI-RS) for at one antenna port from a network in a subframe, wherein the CSI-RS is mapped to at least one pair of resource elements (REs) per physical resource block (PRB) pair in consecutive orthogonal frequency division multiplexing (OFDM) symbols in the subframe, and wherein the subframe includes two slots, and each slot includes six OFDM symbols based on an extended cyclic prefix (CP).

12 Claims, 19 Drawing Sheets

Related U.S. Application Data continuation of application No. 15/402,887, filed on Jan. 10, 2017, now Pat. No. 10,028,265, which is a continuation of application No. 14/746,479, filed on Jun. 22, 2015, now Pat. No. 9,572,137, which is a continuation of application No. 13/498,273, filed as application No. PCT/KR2010/006543 on Sep. 27, 2010, now Pat. No. 9,083,482.

(60) Provisional application No. 61/361,435, filed on Jul. 5, 2010, provisional application No. 61/323,881, filed on Apr. 14, 2010, provisional application No. 61/246,154, filed on Sep. 27, 2009.

(51) Int. Cl.

| | | |
|---|---|---|
| *H04L 5/00* | (2006.01) | |
| *H04L 27/26* | (2006.01) | |
| *H04L 5/14* | (2006.01) | |
| *H04J 11/00* | (2006.01) | |
| *H04B 7/06* | (2006.01) | |
| *H04L 25/02* | (2006.01) | |
| *H04L 25/03* | (2006.01) | |

(52) U.S. Cl.
CPC ........ *H04J 11/0053* (2013.01); *H04L 5/0023* (2013.01); *H04L 5/0048* (2013.01); *H04L 5/0057* (2013.01); *H04L 5/0073* (2013.01); *H04L 5/14* (2013.01); *H04L 5/1469* (2013.01); *H04L 27/2613* (2013.01); *H04L 27/2643* (2013.01); *H04W 72/0406* (2013.01); *H04L 5/0026* (2013.01); *H04L 5/0053* (2013.01); *H04L 5/0082* (2013.01); *H04L 25/0226* (2013.01); *H04L 2025/03426* (2013.01); *H04L 2025/03802* (2013.01)

(58) Field of Classification Search
CPC ... H04L 5/0023; H04L 5/0048; H04L 5/0057; H04L 5/0073; H04L 5/14; H04L 5/1469; H04L 27/2613; H04L 27/2643; H04L 5/0026; H04L 5/0053; H04L 5/0082; H04L 25/0226; H04L 2025/03426; H04L 2025/03802; H04L 5/22; H04L 27/2611
See application file for complete search history.

(56) References Cited

U.S. PATENT DOCUMENTS

| | | |
|---|---|---|
| 9,572,137 B2 | 2/2017 | Noh et al. |
| 10,028,265 B2 * | 7/2018 | Noh .................. H04J 3/00 |
| 10,582,483 B2 * | 3/2020 | Noh .................. H04J 11/0053 |
| 2005/0232156 A1 | 10/2005 | Kim et al. |
| 2008/0070564 A1 | 3/2008 | Li et al. |
| 2009/0135803 A1 | 5/2009 | Luo et al. |
| 2009/0207799 A1 | 8/2009 | Mazzarese |
| 2009/0238064 A1 | 9/2009 | Lee et al. |
| 2010/0246455 A1 | 9/2010 | Nangia et al. |
| 2011/0085457 A1 | 4/2011 | Chen et al. |

FOREIGN PATENT DOCUMENTS

| | | |
|---|---|---|
| EP | 2 466 838 A2 | 6/2012 |
| KR | 10-0911307 B1 | 8/2009 |

OTHER PUBLICATIONS

Fujitsu, "CSI-RS and DRS Design for LTE-A System", 3GPP TSG-RAN1 #57, R1-091950, May 4-8, 2009, pp. 1-9.
Interdigital Communications, LLC, "Assumptions for CSI-RS Design", 3GPP TSG RAN WG1 Meeting #58bis, R1-093885, Miyazaki, Japan, Oct. 12-16, 2009, 7 pages.
NEC Group, "CQI-RS for LTE-Advanced", 3GPP TSG-RAN WG1 Meeting #56bis, R1-091221, Mar. 23-27, 2009, 6 pages.
Nokia, "UE-specific reference symbols for dual-layer beamforming", 3GPP TSG RAN WGI Meetings #57bis, R 1-092554, Jun. 29, 2009-Jul. 3, 2009.
Pantech, "Inter-cell CSI-RS Pattern Design for LTE-A", 3GPP TSG RAN WG1 Meeting #60, San Francisco, USA, Feb. 22-26, 2010, R1-100990, pp. 1-4.
Qualcomm Europe, "Downlink RS Structure in Support of Higher-Order MIMO", 3GPP TSG-RAN WG1 #57, R1-092050, May 4-8, 2009, pp. 1-12.
Samsung, "DL RS Designs for Higher Order MIMO", 3GPP TSG RAN WG1 #56, R1-090619, Feb. 9-13, 2009, 7 pages.
Samsung, "Necessity of Orthogonal Inter-cell CSI-RS Patterns", 3GPP TSG RAN WG1 #60, San Francisco, USA, Feb. 22-26, 2010, R1-101156.
Texas Instruments, "CSI Measurement with Dowling Reference Signal", 3GPP TSG RAN WG1 Meeting #57bis, R1-092396, Jun. 29, 2009-Jul. 3, 2009, 3 pages.
ZTE, "Discussion of CQI-RS design for LTE-A CoMP", 3GPP TSG-RAN Working Group 1 Meeting #56, R1-090632, Athens, Greece, Feb. 9-13, 2009. 4 pages.
Catt et al., "Downlink Demodulation RS Design," 3GPP TSG RAN WG1 meeting #58, R1-093519, Shenzhen, China, Aug. 24-28, 2009, pp. 1-6.
Catt, "Consideration on Rel-8 CRS and Rel-10 CSI RS in LTE-A," 3GPP TSG RAN WG1 meeting #58, R1-093518, Shenzhen, China, Aug. 24-28, 2009, pp. 1-4.
Catt, "Further investigation on multiplexing of CSI-RS for LTE-A," 3GPP TSG RAN WG1 meeting #57bis, R1-092774, Los Angeles, USA, Jun. 29-Jul. 3, 2009, pp. 1-3.
Huawei, "Consideration on CSI-RS design for CoMP and text proposal to 36.814," 3GPP TSG RAN WG1 meeting #58, R1-093031, Shenzhen, China, Aug. 24-28, 2009, pp. 1-8.
Qualcomm Europe, "Link analyses of different reference signal designs for dual-stream beamforming," 3GPP TSG-RAN WG1 #58, R1-093100, Shenzhen, China, Aug. 24-28, 2009, pp. 1-16.

* cited by examiner

FIG. 6
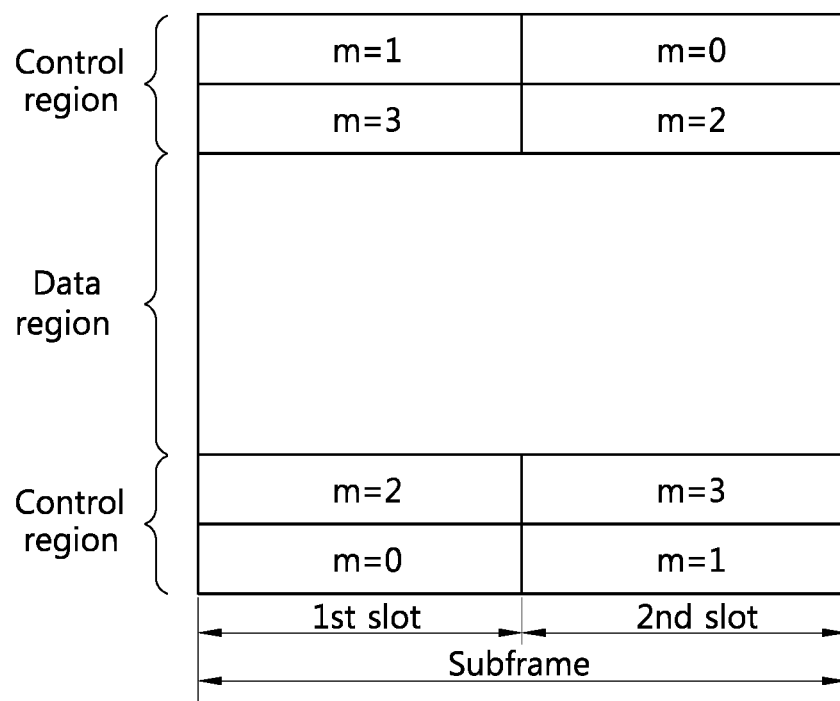
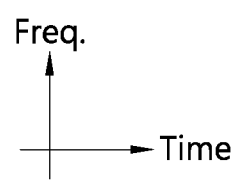

Antenna 0

METHOD AND APPARATUS FOR TRANSMITTING REFERENCE SIGNAL IN WIRELESS COMMUNICATION SYSTEM

CROSS-REFERENCE TO RELATED APPLICATIONS

This Application is a Continuation of U.S. patent application Ser. No. 16/023,737 filed on Jun. 29, 2018 (now U.S. Pat. No. 10,582,483 issued on Mar. 3, 2020), which is a Continuation of U.S. patent application Ser. No. 15/402,887 filed on Jan. 10, 2017 (now U.S. Pat. No. 10,028,265 issued on Jul. 17, 2018), which is a Continuation of U.S. patent application Ser. No. 14/746,479 filed on Jun. 22, 2015 (now U.S. Pat. No. 9,572,137 issued on Feb. 14, 2017), which is a Continuation of U.S. patent application Ser. No. 13/498,273 filed on Jun. 27, 2012 (now U.S. Pat. No. 9,083,482 issued on Jul. 14, 2015), which is filed as the National Phase of PCT/KR2010/006543 filed on Sep. 27, 2010, which claims the benefit under 35 U.S.C. § 119(e) to U.S. Provisional Application Nos. 61/361,435 filed on Jul. 5, 2010, 61/323,881 filed on Apr. 14, 2010 and 61/246,154 filed on Sep. 27, 2009, and under 35 U.S.C. § 119(a) to Korean Patent Application No. 10-2010-0093216 filed on Sep. 27, 2010, all of these applications are hereby expressly incorporated by reference into the present application.

BACKGROUND OF THE INVENTION

Field of the Invention

The present invention relates to wireless communications, and more particularly, to a method and apparatus for transmitting a reference signal in a wireless communication system.

Description of the Related Art

The next-generation multimedia wireless communication systems which are recently being actively researched are required to process and transmit various pieces of information, such as video and wireless data as well as the initial voice-centered services. The 4th generation wireless communication systems which are now being developed subsequently to the 3rd generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, Inter-Symbol Interference (ISI), and the Doppler Effect resulting from the mobility of a user equipment. A variety of techniques are being developed in order to overcome the abnormal characteristics of the wireless channel and to increase the reliability of wireless communication.

Technology for supporting reliable and high-speed data service includes Orthogonal Frequency Division Multiplexing (OFDM), Multiple Input Multiple Output (MIMO), and so on. An OFDM system is being considered after the 3rd generation system which is able to attenuate the ISI effect with low complexity. The OFDM system converts symbols, received in series, into N (N is a natural number) parallel symbols and transmits them on respective separated N subcarriers. The subcarriers maintain orthogonality in the frequency domain. It is expected that the market for mobile communication will shift from the existing Code Division Multiple Access (CDMA) system to an OFDM-based system. MIMO technology can be used to improve the efficiency of data transmission and reception using multiple transmission antennas and multiple reception antennas. MIMO technology includes spatial multiplexing, transmit diversity, beam-forming and the like. An MIMO channel matrix according to the number of reception antennas and the number of transmission antennas can be decomposed into a number of independent channels. Each of the independent channels is called a layer or stream. The number of layers is called a rank.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a Reference Signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value ĥ using Equation 1 in the case in which a Least Square (LS) method is used.

$$\hat{h} = y/p = h + n/p = h + \hat{n} \qquad \text{[Equation 1]}$$

The accuracy of the channel estimation value ĥ estimated using the reference signal p is determined by the value ñ. To accurately estimate the value h, the value ñ must converge on 0. To this end, the influence of the value ñ has to be minimized by estimating a channel using a large number of reference signals. A variety of algorithms for a better channel estimation performance may exist.

There is a channel state information (CSI)-reference signal (RS) for channel estimation in 3rd generation partnership project (3GPP) long term evolution-advanced (LTE-A). The CSI-RS can be transmitted for each of a plurality of layers. Meanwhile, a subframe having an extended cyclic prefix (CP) structure has a small number of available OFDM symbols, and thus has a small number of OFDM symbols to which the CSI-RS can be mapped. Accordingly, collision may occur when the CSI-RS is transmitted in a plurality of cells. Therefore, there is a need for a CSI-RS transmission method for improving channel estimation performance in the subframe having the extended CP structure.

SUMMARY OF THE INVENTION

The present invention provides a method and apparatus for transmitting a reference signal in a wireless communication system.

In an aspect, a method for transmitting a reference signal (RS) by a base station in a wireless communication system is provided. The method includes generating a channel state information (CSI)-RS for each of a plurality of layers, mapping the plurality of CSI-RSs to a resource element set consisting of a plurality of resource elements (REs) in a subframe, and transmitting the subframe to which the plurality of CSI-RSs are mapped, wherein the plurality of REs constituting the resource element set are resource elements that are arranged with constant subcarrier spacing in two neighboring orthogonal frequency division multiplexing (OFDM) symbols, and wherein the subframe has an extended cyclic prefix (CP) structure including 12 OFDM symbols. The resource element included in the resource element set may be a resource element to which a cell-specific reference signal (CRS) of 3rd generation partnership project (3GPP) long-term evolution (LTE) rel-8 and a user equipment (UE)-specific RS of 3GPP LTE-advanced (LTE-A) are not mapped, and wherein the CRS of the 3GPP LTE rel-8 may be a CRS for antenna ports 0 and 1. The resource element set may be any one selected from a plurality of different resource element sets. The number of the different resource element sets may be 7. The resource element set may be any one selected from the plurality of different resource element sets on the basis of a cell identifier (ID). A CSI-RS mapped to the same resource element in the resource element set among the plurality of CSI-RSs may be multiplexed by using code division multiplexing (CDM) along a time domain. The CSI-RS may be CDM-multiplexed on the basis of an orthogonal sequence having a length of 2. The two neighboring OFDM symbols may be 5th and 6th OFDM symbols or 8th and 9th OFDM symbols or 11th and 12th OFDM symbols. The constant subcarrier spacing may be 3-subcarrier spacing.

In another aspect, a method for channel estimation by a user equipment in a wireless communication system is provided. The method includes receiving a channel state information (CSI) reference signal (RS) for each of a plurality of layers, and estimating a channel by processing the plurality of received CSI-RSs, wherein the plurality of CSI-RSs are transmitted by being mapped to a resource element set consisting of a plurality of REs in a subframe, wherein the plurality of resource elements constituting the resource element set are resource elements that are arranged with 3-subcarrier spacing in two neighboring OFDM symbols, and wherein the subframe has an extended CP structure including 12 OFDM symbols.

In another aspect, an apparatus for transmitting a reference signal (RS) is provided. The apparatus includes a radio frequency (RF) unit for transmitting a subframe, and a processor coupled to the RF unit, wherein the processor is configured for generating a CSI-RS for each of a plurality of layers, and mapping the plurality of CSI-RSs to a resource element set consisting of a plurality of REs in the subframe, wherein the plurality of resource elements constituting the resource element set are resource elements that are arranged with 3-subcarrier spacing in two neighboring OFDM symbols, and wherein the subframe has an extended CP structure including 12 OFDM symbols.

According to the present invention, channel estimation performance can be improved by increasing the number of resources elements to which a channel state information (CSI)-reference signal (RS) of 3rd generation partnership project (3GPP) long term evolution-advanced (LTE-A) can be mapped.

BRIEF DESCRIPTION OF THE DRAWINGS

FIG. 6 shows the structure of an uplink subframe.

DETAILED DESCRIPTION OF THE INVENTION

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LET-A will be largely described, but the technical concept of the present invention is not meant to be limited thereto.

Figure 1:
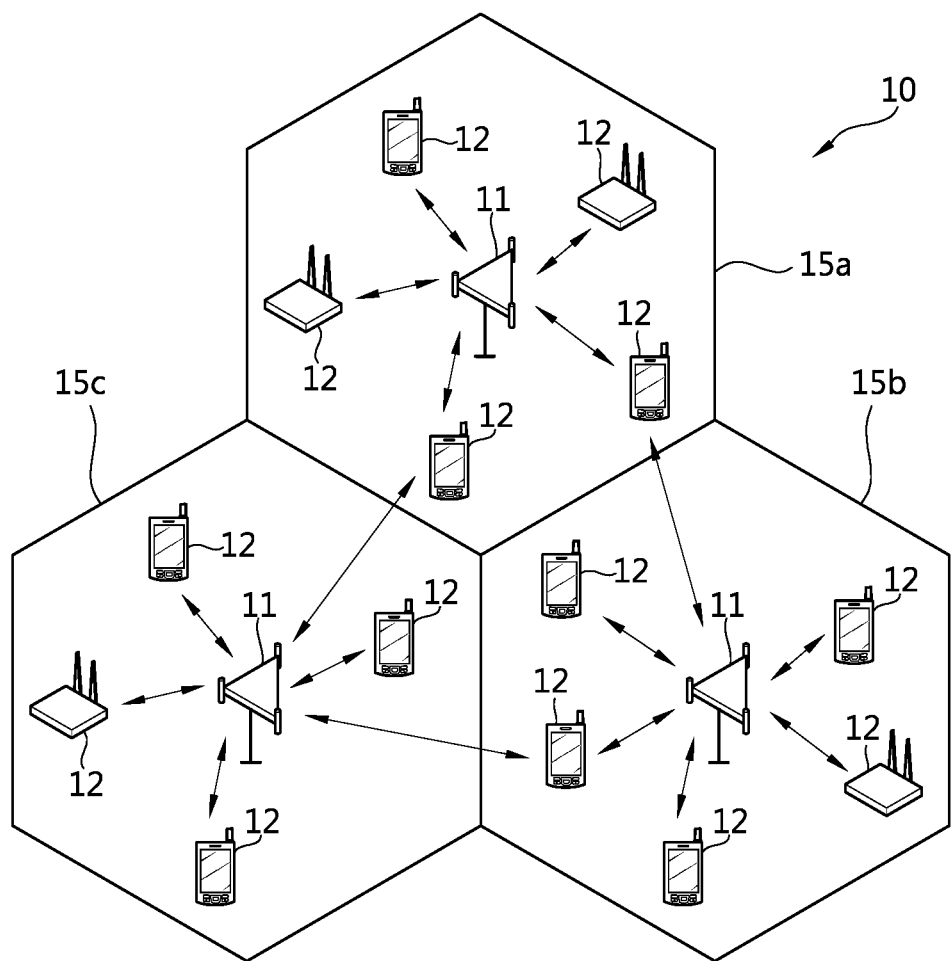
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

Figure 2:
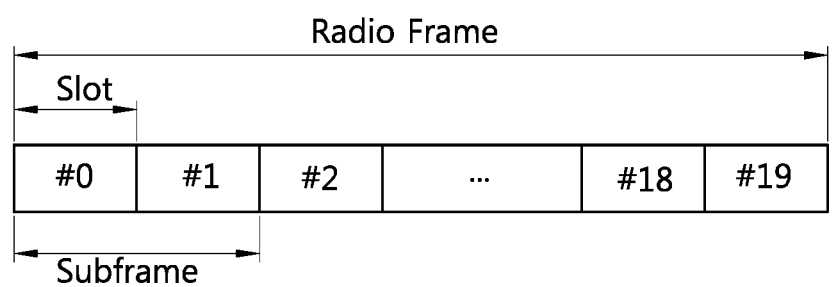
FIG. 2 shows the structure of a radio frame in 3GPP LTE.

FIG. 2 shows the structure of a radio frame in 3GPP LTE. It may be referred to Paragraph 4.1 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008 March).

Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of OFDM (Orthogonal Frequency Division Multiplexing) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary. 3GPP LTE defines that one slot includes seven OFDM symbols in a normal cyclic prefix (CP) and one slot includes six OFDM symbols in an extended CP.

Figure 3:
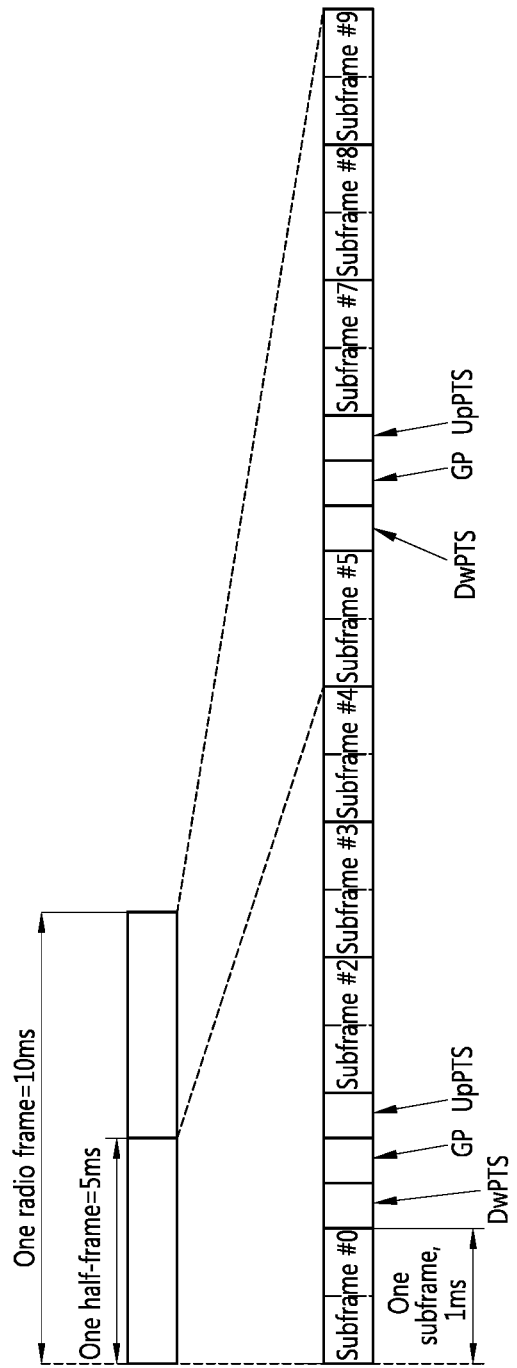
FIG. 3 shows a structure of a time division duplex (TDD) radio frame in 3GPP LTE.

FIG. 3 shows a structure of a time division duplex (TDD) radio frame in 3GPP LTE. Section 4.2 of the 3GPP TS 36.211 V8.2.0 (2008 March) "Technical Specification Group Radio Access Network; Evolved Universal Terrestrial Radio Access (E-UTRA); Physical Channels and Modulation (Release 8)" may be incorporated herein by reference. One radio frame has a length of 10 milliseconds (ms) and consists of two half-frames each having a length of 5 ms. One half-frame consists of five subframes each having a length of 1 ms.

One subframe is designated as any one of an uplink (UL) subframe, a downlink (DL) subframe, and a special subframe. Table 1 shows a structure of a configurable frame according to arrangement of the UL subframe and the DL subframe in a 3GPP LTE TDD system. In Table 1, 'D' denotes the DL subframe, 'U' denotes the UL subframe, and 'S' denotes the special subframe.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The switch-point periodicity may be 5 ms or 10 ms. In case of the 5 ms switch-point periodicity, the special subframe may be present in both of two half-frames in one subframe. In case of the 10 ms switch-point periodicity, the special subframe may be present only in a first half-frame.

The special subframe is a specific period positioned between the UL subframe and the DL subframe for the purpose of UL-DL separation. One radio frame includes at least one special subframe. The special subframe includes a downlink pilot time slot (DwPTS), a guard period (GP), and an uplink pilot time slot (UpPTS). The DwPTS is used for initial cell search, synchronization, or channel estimation. The UpPTS is used for channel estimation in a BS and UL transmission synchronization of a UE. The GP is positioned between the UL time slot and the DL time slot and is used to remove interference that occurs in UL transmission due to a multi-path delay of a DL signal. Table 2 shows lengths of the DwPTS, the GP, and the UpPTS according to a structure of the special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | 4384*Ts | 5120*ts |
| 5 | 6592*Ts | 4384*Ts | 5120*ts | 20480*Ts | | |
| 6 | 19760*Ts | | | 23040*Ts | | |
| 7 | 21952*Ts | | | — | | |
| 8 | 24144*Ts | | | — | | |

The subframe 0, the subframe 5, and the DwPTS of the special subframe are always allocated for downlink transmission. The UpPTS of the special subframe and the subframe following the special subframe are always allocated for uplink transmission.

Figure 4:
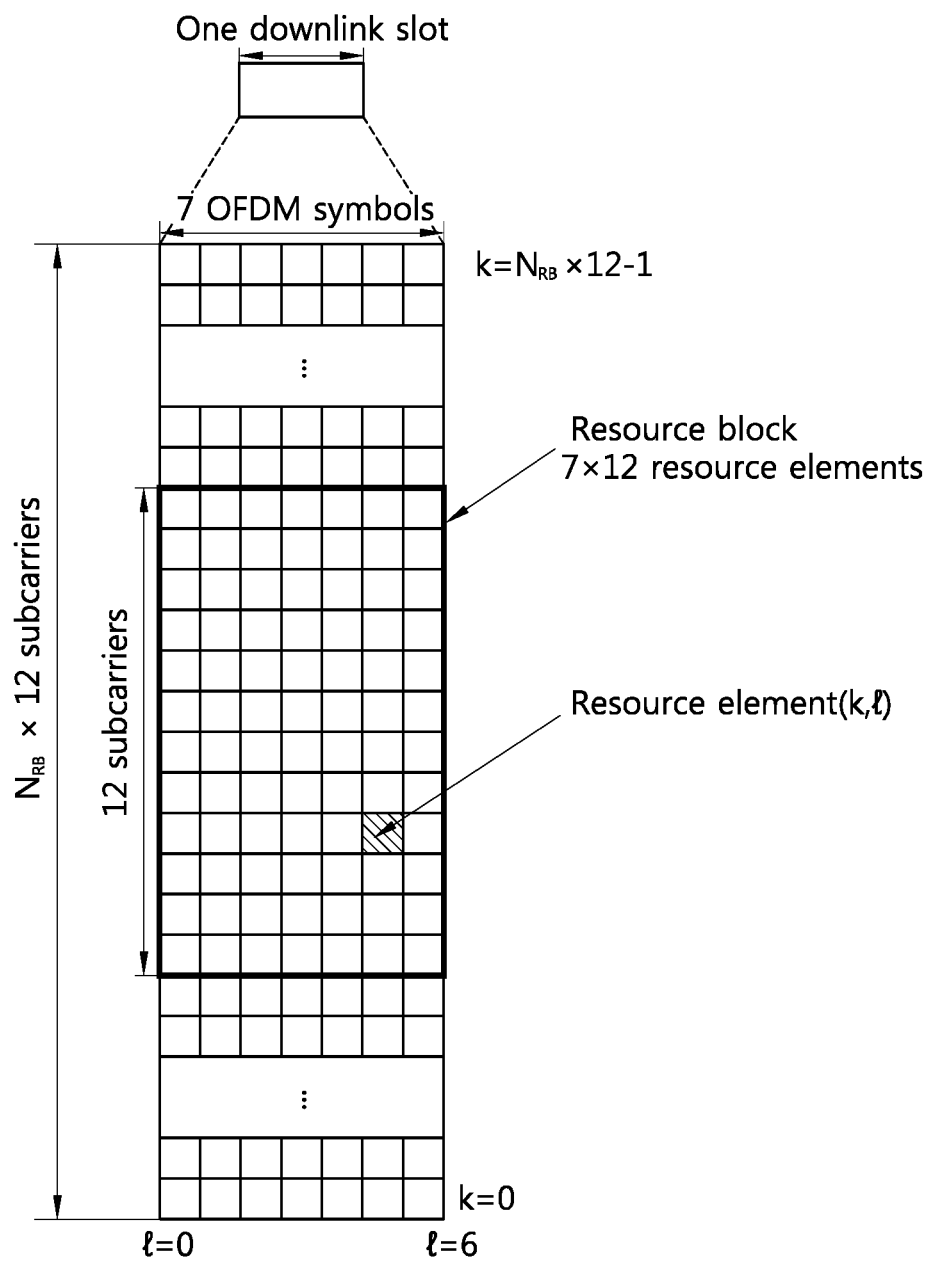
FIG. 4 shows an example of a resource grid of a single downlink slot.

FIG. 4 shows an example of a resource grid of a single downlink slot.

A downlink slot includes a plurality of OFDM symbols in the time domain and NRB number of resource blocks (RBs) in the frequency domain. The NRB number of resource blocks included in the downlink slot is dependent upon a downlink transmission bandwidth set in a cell. For example, in an LTE system, NRB may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , NRB×12−1) is a subcarrier index in the frequency domain, and 1 is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 5:
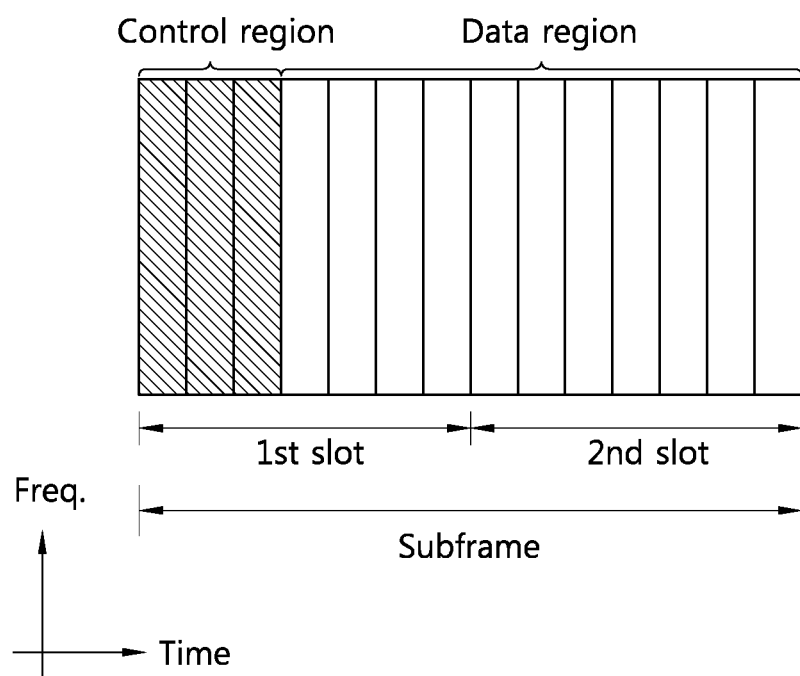
FIG. 5 shows the structure of a downlink subframe.

FIG. 5 shows the structure of a downlink subframe.

A downlink subframe includes two slots in the time domain, and each of the slots includes seven OFDM symbols in the normal CP. First three OFDM symbols (maximum four OFDM symbols with respect to a 1.4 Mhz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCD corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

FIG. 6 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH are frequency-hopped at the slot boundary. The UE can obtain a frequency diversity gain by transmitting uplink control information through different subcarriers according to time. In FIG. 6, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, an scheduling request (SR), and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

A reference signal is generally transmitted as a sequence. A reference signal sequence is not particularly limited and a certain sequence may be used as the reference signal sequence. As the reference signal sequence, a sequence generated through a computer based on phase shift keying (PSK) (i.e., a PSK-based computer generated sequence) may be used. The PSK may include, for example, binary phase shift keying (BPSK), quadrature phase shift keying (QPSK), and the like. Or, as the reference signal sequence, a constant amplitude zero auto-correlation (CAZAC) may be used. The CAZAC sequence may include, for example, a Zadoff-Chu (ZC)-based sequence, a ZC sequence with cyclic extension, a ZC sequence with truncation, and the like. Also, as the reference signal sequence, a pseudo-random (PN) sequence may be used. The PN sequence may include, for example, an m-sequence, a sequence generated through a computer, a gold sequence, a Kasami sequence, and the like. Also, a cyclically shifted sequence may be used as the reference signal sequence.

A reference signal can be classified into a cell-specific reference signal (CRS), an MBSFN reference signal, a user equipment-specific reference signal (UE-specific RS) and a position reference signal (PRS). The CRS is transmitted to all the UEs within a cell and used for channel estimation. The MBSFN reference signal can be transmitted in subframes allocated for MBSFN transmission. The UE-specific reference signal is received by a specific UE or a specific UE group within a cell, and may be referred to a dedicated RS (DRS). The DRS is chiefly used by a specific UE or a specific UE group for the purpose of data demodulation.

First, a CRS is described.

Figure 7:
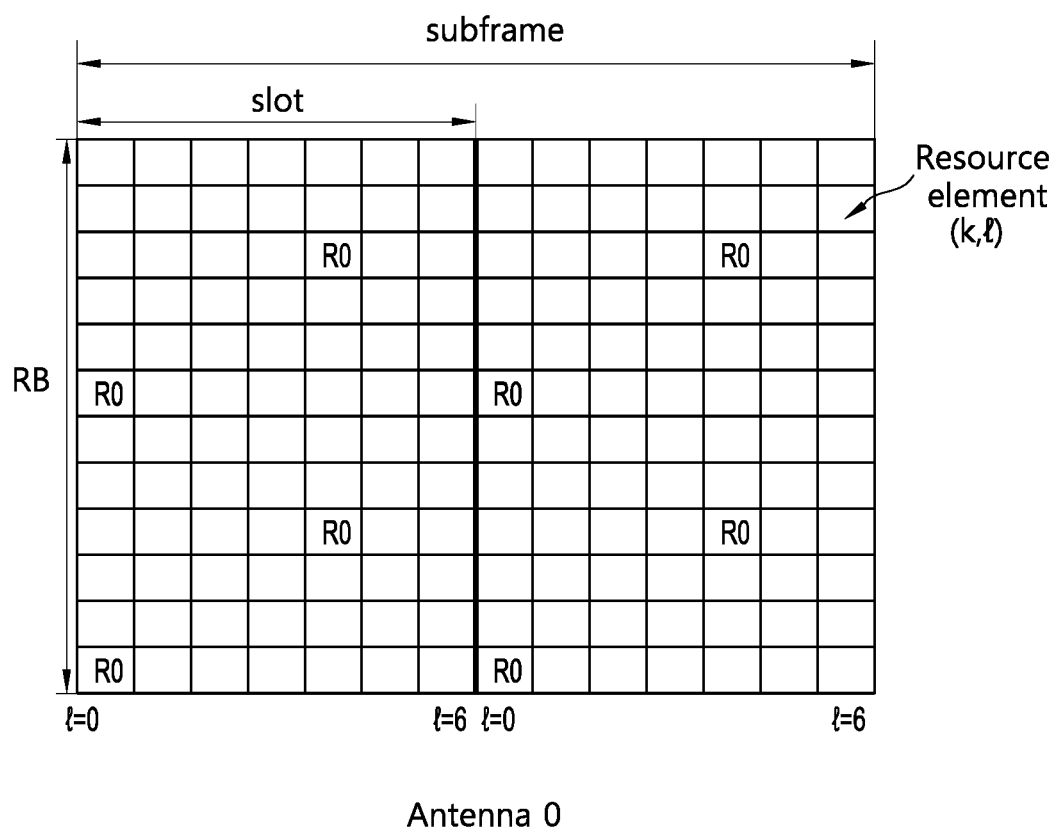
FIGS. 7 to 9 show an exemplary CRS structure.
Figure 8:
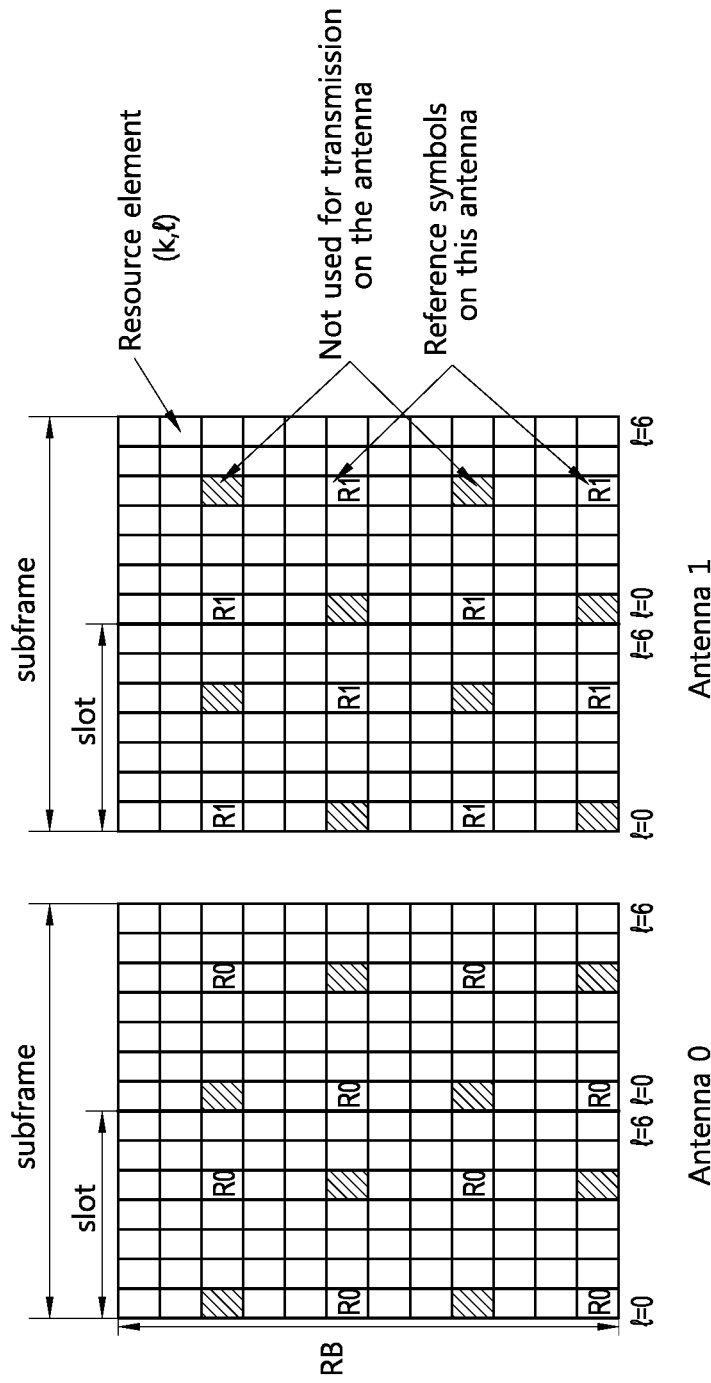
Figure 9:
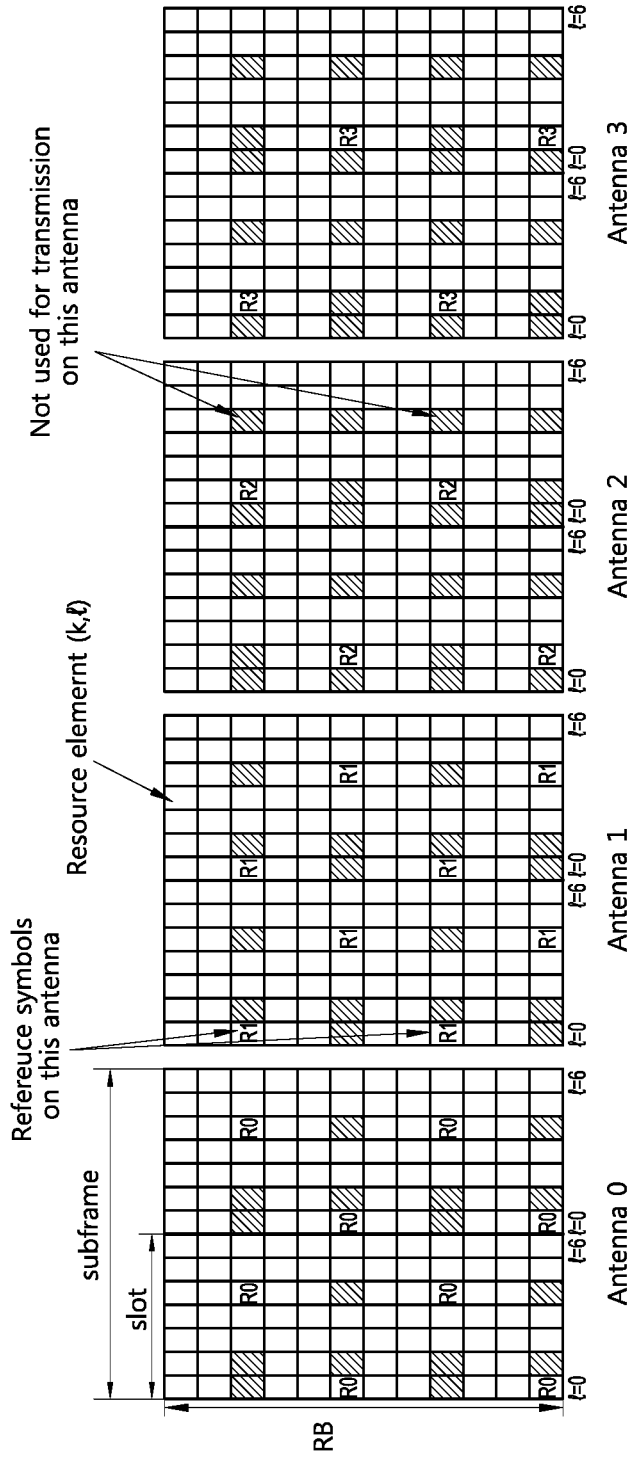

FIGS. 7 to 9 show an exemplary CRS structure. FIG. 7 shows an exemplary CRS structure when a BS uses one antenna. FIG. 8 shows an exemplary CRS structure when a BS uses two antennas. FIG. 9 shows an exemplary CRS structure when a BS uses four antennas. The section 6.10.1 of 3GPP TS 36.211 V8.2.0 (2008 March) may be incorporated herein by reference. In addition, the exemplary CRS structure may be used to support a feature of an LTE-A system. Examples of the feature of the LTE-A system include coordinated multi-point (CoMP) transmission and reception, spatial multiplexing, etc.

Referring to FIG. 7 to FIG. 9, in multi-antenna transmission, a BS uses a plurality of antennas, each of which has one resource grid. 'R0' denotes an RS for a first antenna, 'R1' denotes an RS for a second antenna, 'R2' denotes an RS for a third antenna, and 'R3' denotes an RS for a fourth antenna. R0 to R3 are located in a subframe without overlapping with one another. l indicates a position of an OFDM symbol in a slot. In case of a normal cyclic prefix (CP), l has a value in the range of 0 to 6. In one OFDM symbol, RSs for the respective antennas are located with a spacing of 6 subcarriers. In a subframe, the number of R0s is equal to the number of R1s, and the number of R2s is equal to the number of R3s. In the subframe, the number of R2s and R3s is less than the number of R0s and R1s. A resource element used for an RS of one antenna is not used for an RS of another antenna. This is to avoid interference between antennas.

The CRS is always transmitted by the number of antennas irrespective of the number of streams. The CRS has an independent RS for each antenna. A frequency-domain position and a time-domain position of the CRS in a subframe are determined irrespective of a UE. A CRS sequence to be multiplied to the CRS is generated also irrespective of the UE. Therefore, all UEs in a cell can receive the CRS. However, a position of the CRS in the subframe and the CRS sequence may be determined according to a cell identifier (ID). The time-domain position of the CRS in the subframe may be determined according to an antenna number and the number of OFDM symbols in a resource block. The frequency-domain position of the CRS in the subframe may be determined according to an antenna number, a cell ID, an OFDM symbol index l, a slot number in a radio frame, etc.

The CRS sequence may be applied on an OFDM symbol basis in one subframe. The CRS sequence may differ according to a cell ID, a slot number in one radio frame, an OFDM symbol index in a slot, a CP type, etc. The number of RS subcarriers for each antenna on one OFDM symbol is 2. When a subframe includes NRB resource blocks in a frequency domain, the number of RS subcarriers for each antenna on one OFDM symbol is 2×NRB. Therefore, a length of the CRS sequence is 2×NRB.

Equation 2 shows an example of a CRS sequence r(m).

$$r(m) = \frac{1}{\sqrt{2}}(1 - 2 \cdot c(2m)) + j\frac{1}{\sqrt{2}}(1 - 2 \cdot c(2m+1)) \quad \text{[Equation 2]}$$

Herein, m is 0,1, . . . , 2 NRB,max-1. NRB,max denotes the number of resource blocks corresponding to a maximum bandwidth. For example, when using a 3GPP LTE system, NRB,max is 110. c(i) denotes a PN sequence as a pseudo-random sequence, and can be defined by a gold sequence having a length of 31. Equation 3 shows an example of a gold sequence c(n).

$$c(n)=(x_1(n+N_C)+x_2(n+N_C)) \bmod 2 x_1(n+31)=(x_1(n+3)+ \\ x_1(n)) \bmod 2 x_2(n+31)=(x_2(n+3)+x_2(n+2)+x_2(n+ \\ 1)+x_2(n)) \bmod 2 \quad \text{[Equation 3]}$$

Herein, NC is 1600, x1(i) denotes a 1st m-sequence, and x2(i) denotes a 2nd m-sequence. For example, the 1st m-sequence or the 2nd m-sequence can be initialized for each OFDM symbol according to a cell ID, a slot number in one radio frame, an OFDM symbol index in a slot, a CP type, etc.

In case of using a system having a bandwidth narrower than NRB,max, a certain part with a length of 2×NRB can be selected from an RS sequence generated in a length of 2×NRB,max.

The CRS may be used in the LTE-A system to estimate channel state information (CSI). A reference signal for estimating channel state information may be referred to a channel state information reference signal (CSI-RS). A CSI-RS is relatively sparse deployed in a frequency domain or a time domain. A CSI-RS may be punctured in a data region of a normal subframe or an MBSFN subframe. If necessary for estimation of the CSI, channel quality indicator (CQI), a precoding matrix indicator (PMI), a rank indicator (RI), or the like may be reported from the UE.

A DRS is described below.

Figure 10:
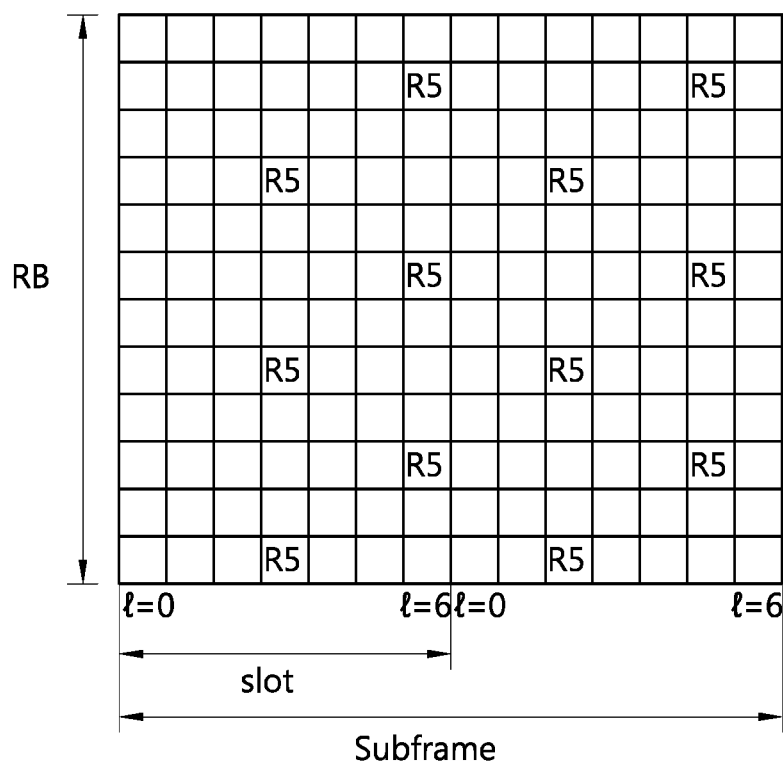
FIGS. 10 and 11 show examples of a DRS structure.
Figure 11:
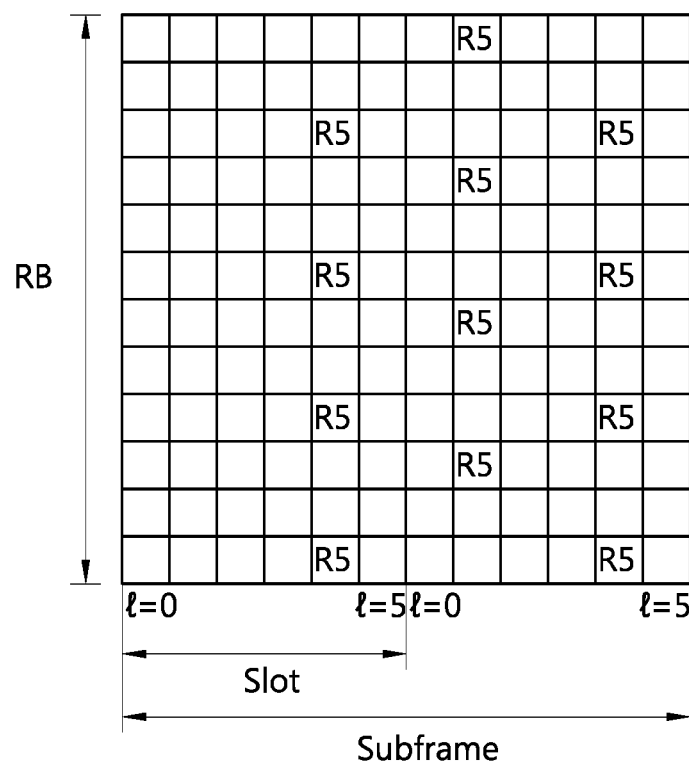

FIGS. 10 and 11 show examples of a DRS structure. FIG. 10 shows an example of the DRS structure in the normal CP (Cyclic Prefix). In the normal CP, a subframe includes 14 OFDM symbols. R5 indicates the reference signal of an antenna which transmits a DRS. On one OFDM symbol including a reference symbol, a reference signal subcarrier is positioned at intervals of four subcarriers. FIG. 11 shows an example of the DRS structure in the extended CP. In the extended CP, a subframe includes 12 OFDM symbols. On one OFDM symbol, a reference signal subcarrier is positioned at intervals of three subcarriers. For detailed information, reference can be made to Paragraph 6.10.3 of 3GPP TS 36.211 V8.2.0 (2008 March).

The position of a frequency domain and the position of a time domain within the subframe of a DRS can be determined by a resource block assigned for PDSCH transmission. A DRS sequence can be determined by a UE ID, and only a specific UE corresponding to the UE ID can receive a DRS.

A DRS sequence can be obtained using Equations 2 and 3. However, m in Equation 2 is determined by NRBPDSCH. NRBPDSCH is the number of resource blocks corresponding to a bandwidth corresponding to PDSCH transmission. The length of a DRS sequence can be changed according to NRBPDSCH. That is, the length of a DRS sequence can be changed according to the amount of data assigned to a UE. In Equation 2, a first m-sequence x1(i) or a second m-sequence x2(i) can be reset according to a cell ID, the position of a subframe within one radio frame, a UE ID, etc. for every subframe.

A DRS sequence can be generated for every subframe and applied for every OFDM symbol. It is assumed that the number of reference signal subcarriers per resource block is 12 and the number of resource blocks is NRBPDSCH, within one subframe. The total number of reference signal subcarriers is 12×NRBPDSCH. Accordingly, the length of the DRS sequence is 12×NRBPDSCH. In the case in which DRS sequences are generated using Equation 2, m is 0, 1, ..., 12NRBPDSCH-1. The DRS sequences are sequentially mapped to reference symbols. The DRS sequence is first mapped to the reference symbol and then to a next OFDM symbol, in ascending powers of a subcarrier index in one OFDM symbol.

Further, a Cell-specific Reference Signal (CRS) can be used together with a DRS. For example, it is assumed that control information is transmitted through three OFDM symbols (l=0, 1, 2) of a first slot within a subframe. A CRS can be used in an OFDM symbol having an index of 0, 1, or 2 (l=0, 1, or 2), and a DRS can be used in the remaining OFDM symbol other than the three OFDM symbols. Here, by transmitting a predefined sequence which is multiplied by a downlink reference signal for each cell, interference between reference signals received by a receiver from neighbor cells can be reduced, and so the performance of channel estimation can be improved. The predefined sequence can be one of a PN sequence, an m-sequence, a Walsh hadamard sequence, a ZC sequence, a GCL sequence, and a CAZAC sequence. The predefined sequence can be applied to each OFDM symbol within one subframe, and another sequence can be applied depending on a cell ID, a subframe number, the position of an OFDM symbol, and a UE ID.

In the LTE-A system, a DRS can be use in PDSCH demodulation. Here, a PDSCH and a DRS can comply with the same precoding operation. The DRS can be transmitted only in a resource block or layer scheduled by a Base Station (BS), and orthogonality is maintained between layers.

Figure 12:
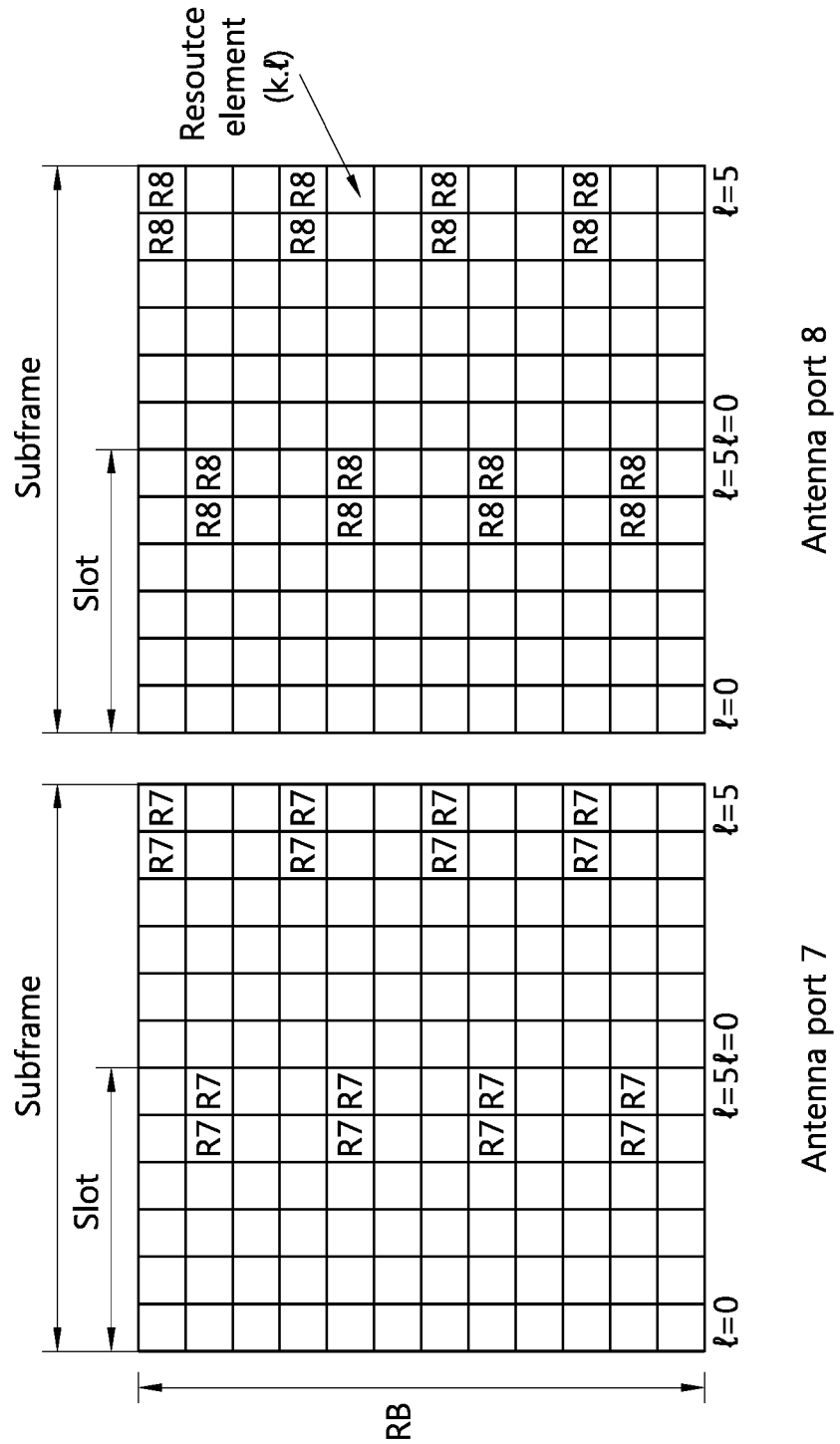
FIG. 12 shows an example of a UE-specific RS structure in 3GPP LTE-A.

FIG. 12 shows an example of a UE-specific RS structure in 3GPP LTE-A.

Referring to FIG. 12, a UE-specific RS for two antenna ports R7 and R8 is transmitted in a subframe having an extended CP structure. In the 3GPP LTE-A, the UE-specific RS can support up to two antenna ports. A UE-specific RS for the antenna port 7 is transmitted on a resource element corresponding to 2nd, 5th, 8th, and 11th subcarriers of 5th and 6th OFDM symbols and a resource element corresponding to 1st, 4th, 7th, and 10th subcarriers of 11th and 12th OFDM symbols. Likewise, a UE-specific RS for the antenna port 8 is transmitted on a resource element corresponding to 2nd, 5th, 8th, and 11th subcarriers of 5th and 6th OFDM symbols and a resource element corresponding to 1st, 4th, 7th, and 10th subcarriers of 11th and 12th OFDM symbols. That is, the UE-specific RSs for the antenna ports 7 and 8 can be transmitted by being mapped to the same resource element. In this case, an RS sequence for each antenna port can be transmitted by being multiplied by different orthogonal sequences. For example, an orthogonal sequence [+1 +1] having a length of 2 and mapped to neighboring OFDM symbols can be multiplied by an RS sequence for the antenna port 7. In addition, an orthogonal sequence [−1 +1] having a length of 2 and mapped to neighboring OFDM symbols can be multiplied by an RS sequence for the antenna port 8. Examples of the orthogonal sequence may include various types of orthogonal sequences, such as, a Walsh code, a discrete Fourier transform (DFT) coefficient, a CAZAC sequence, etc.

In addition to a CRS of 3GPP LTE rel-8 and a UE-specific RS for each antenna port, a CSI-RS for 3GPP LTE-A used to estimate or measure a channel state can be additionally transmitted by being mapped to a resource block. The CSI-RS can be mapped while avoiding overlapping with the resource element to which the CRS or the UE-specific RS is mapped. The CSI-RS can be transmitted for each antenna port.

Meanwhile, a CRS for the antenna ports 2 and 3 may not be transmitted in the subframe having the extended CP structure. That is, the CRS structure of FIG. 8 may be used rather than the CRS structure of FIG. 9. This is to effectively utilize insufficient radio resources since the subframe having the extended CP structure consists of 12 OFDM symbols. Accordingly, an OFDM symbol on which the CRS for the antenna ports 2 and 3 is transmitted can be allocated for the CSI-RS or another RS, or can be allocated to data.

Hereinafter, the proposed RS transmission method will be described according to an embodiment of the present invention. The present invention proposes various RS patterns for mapping a CSI-RS when an RS of the antenna ports 2 and 3 of 3GPP LTE rel-8 is not transmitted. Although a subframe having an extended CP structure is described for example in the present invention, the present invention can also equally apply to a subframe having a normal CP structure. In an RS pattern proposed in the present invention, a horizontal axis represents a time domain or an OFDM symbol (indexed with OFDM symbol indices 0 to 11), and a vertical axis represents a frequency domain or a subcarrier (indexed with subcarrier indices 0 to 11). In addition, R0 and R1 represent a CRS of 3GPP LTE rel-8 for antenna ports 0 and 1. The R0 and R1 are mapped according to the CRS structure of FIG. 8. D1 to D4 represent UE-specific RSs (hereinafter, DRSs) of four antenna ports. The DRSs of the four antenna ports can be grouped in pair of two, and then be transmitted by being CDM-multiplexed. The DRS can be transmitted by being mapped to a resource block according to the UE-specific RS structure of FIG. 12, or can be transmitted by being mapped to a resource block according to a pattern in which the UE-specific RS structure of FIG. 12 is shifted along a frequency axis.

Figure 13:
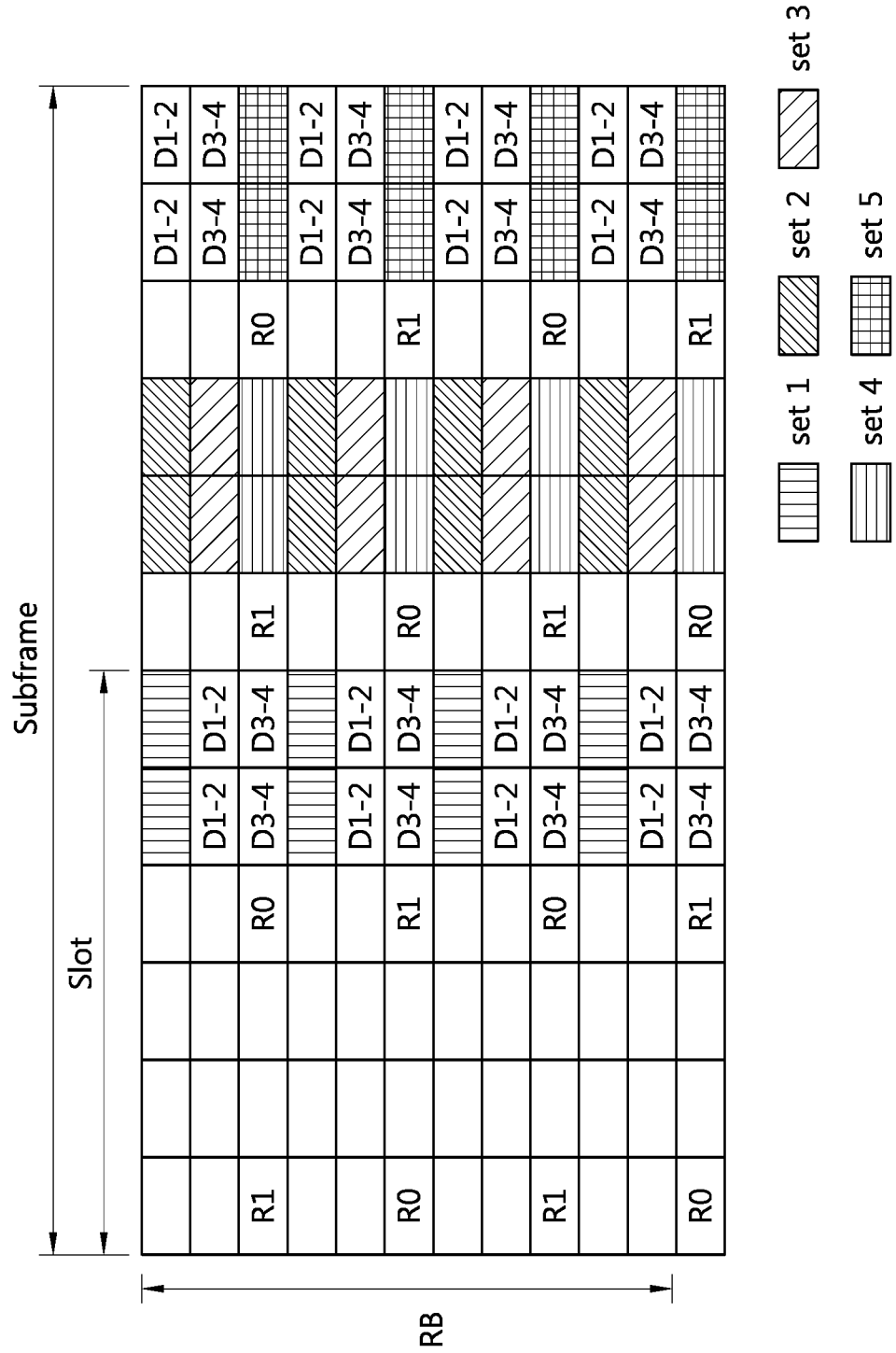
FIGS. 13 to 16 show an example of a CSI-RS pattern according to the proposed invention.

FIG. 13 shows an example of a CSI-RS pattern according to the proposed invention.

Referring to FIG. 13, a resource element to which a CRS and DRS of 3GPP LTE rel-8 are not mapped can be used as a resource element to which a CSI-RS can be mapped. To support up to 8 antenna ports, 8 resource elements can be used in CSI-RS transmission. The 8 resource elements to which the CSI-RS can be mapped constitute one resource element set, and 5 resource element sets may be present in total. A 1st set may include a resource element corresponding to 1st, 4th, 7th, and 10th subcarriers of 5th and 6th OFDM symbols which are OFDM symbols to which a DRS is mapped. A 2nd set to a 4th set occupy 8th and 9th OFDM symbols, and among them, the 2nd set includes a resource element corresponding to 1st, 4th, 7th, and 10th subcarriers, the 3rd set includes a resource element corresponding to 2nd, 5th, 8th, and 11th subcarriers, and the 4th set includes a resource element corresponding to 3rd, 6th, 9th, and 12th subcarriers. The 5th set may include a resource element corresponding to 3rd, 6th, 9th, and 12th subcarriers of 11th and 12th OFDM symbols which are OFDM symbols to which a DRS is mapped. A CSI-RS for up to 8 antenna ports is transmitted in a resource element constituting each resource element set. A location of a resource element to which a CSI-RS of each antenna port is mapped may change in each resource element set. Further, the CSI-RS can be transmitted by being mapped to a different resource element set for each subframe. A BS can select any one set among the 1st set to the 5th set and can map the CSI-RS to a resource element that constitutes a corresponding resource element set. In this case, the selected set may be selected based on a cell ID, for example, based on the equation of (cell ID mod 5)+1.

Figure 14:
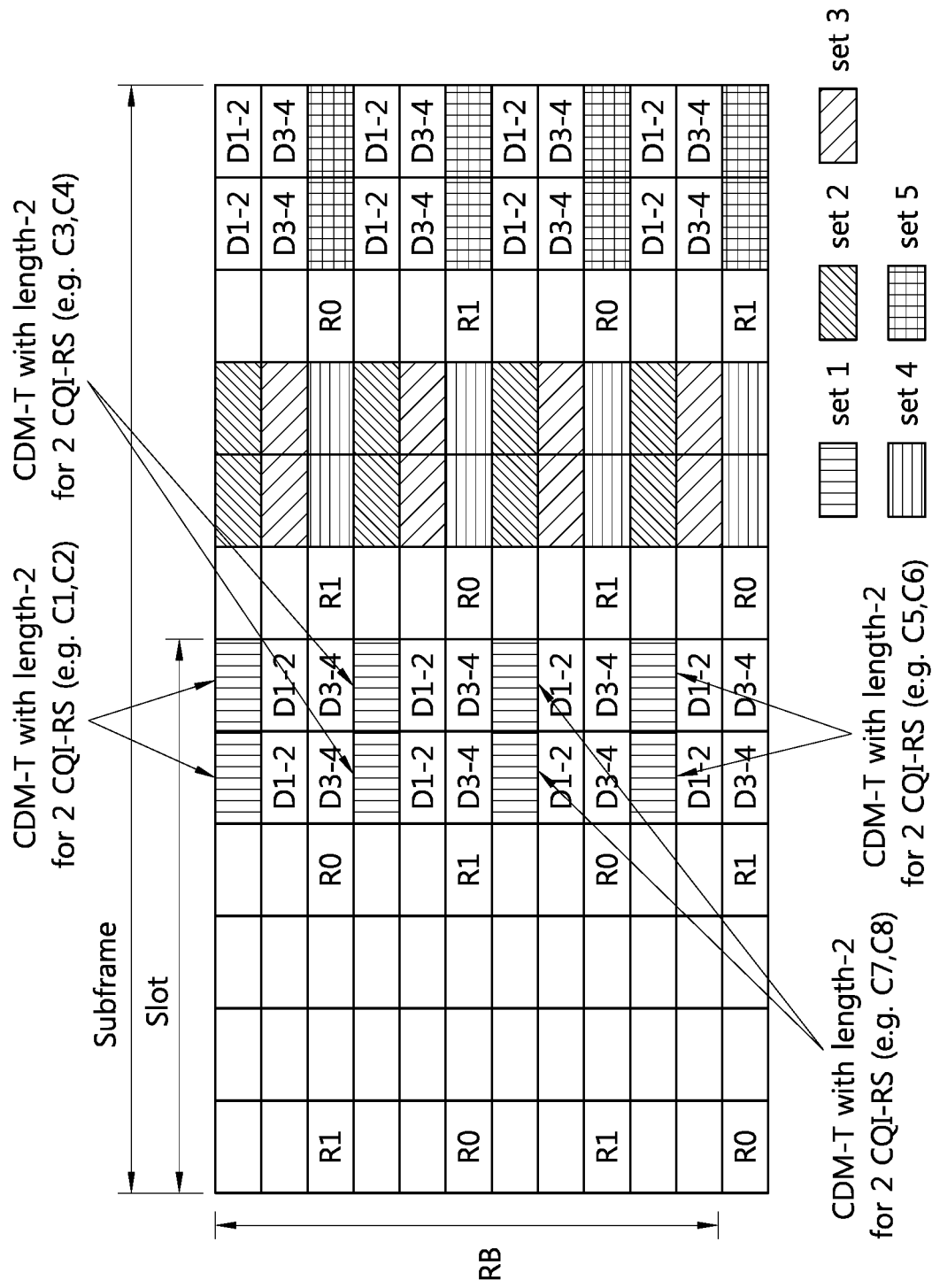

FIG. 14 shows another example of a CSI-RS pattern according to the proposed invention.

Referring to FIG. 14, a CSI-RS is transmitted by being mapped to a resource element set configured in the same manner as FIG. 13, except that the CSI-RS for 8 antenna ports are grouped in pair and are CDM-multiplexed along a time domain. Among resource elements included in a 1st set, a CSI-RS for 1st and 2nd antenna ports can be mapped to a resource element included in a 1st subcarrier. The CSI-RS for the 1st and 2nd antenna ports can be CDM-multiplexed along the time domain by using an orthogonal sequence having a length of 2. Since the CSI-RS is CDM-multiplexed along the time domain, it can be said that the CSI-RS is multiplexed in a CDM-time (T) manner. Likewise, among the resource elements included in the 1st set, a CSI-RS for 3rd and 4th antenna ports can be CDM-multiplexed and mapped along the time domain to a resource element included in a 4th subcarrier. In addition, a CSI-RS for 5th and 6th antenna ports and a CSI-RS for 7th and 8th antenna ports can be CDM-multiplexed and mapped along the time domain respectively to a resource element included in a 7th subcarrier and a resource element included in a 10th subcarrier. A CSI-RS of antenna ports which are CDM-multiplexed in the same carrier is not limited to the present embodiment, and thus can be multiplexed by configuring it with various combinations. A location of a resource element to which a CSI-RS of each antenna port is mapped may change in each resource element set. Further, the CSI-RS can be transmitted by being mapped to a different resource element set for each subframe. A BS can select any one set among the 1st set to the 5th set and can map the CSI-RS to a resource element that constitutes a corresponding resource element set. In this case, the selected set may be selected based on a cell ID, for example, based on the equation of (cell ID mod 5)+1.

Meanwhile, a UE-specific RS of up to rank-2 can be supported. That is, instead of transmitting a DRS for 4 antenna ports, only a DRS for two antenna ports can be transmitted. In this case, a resource element allocated for a UE-specific RS of layers 3 and 4 can be allocated to a CSI-RS, and thus the number of resource element sets to which the CSI-RS can be mapped may increase.

Figure 15:
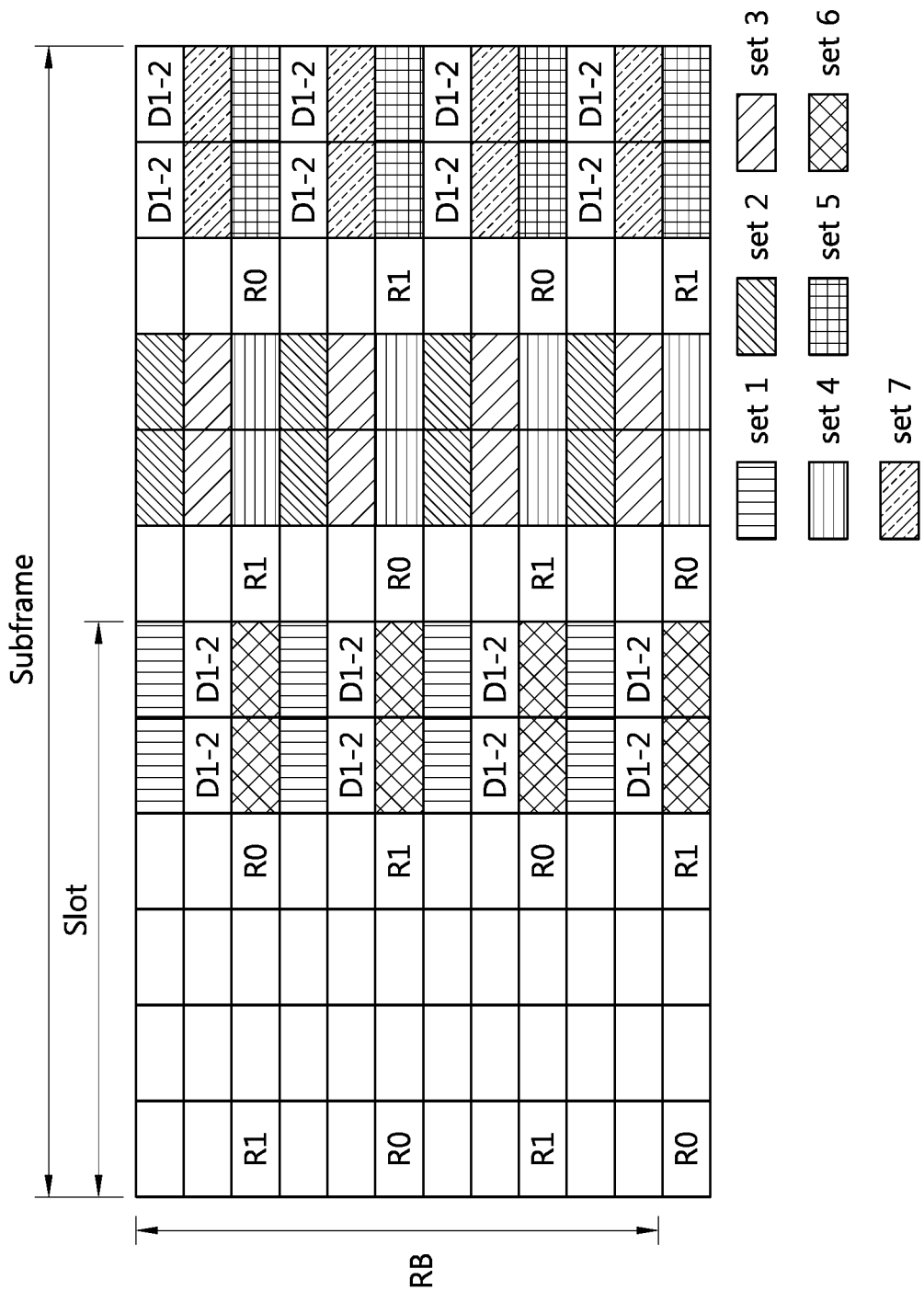

FIG. 15 shows another example of a CSI-RS pattern according to the proposed invention.

The CSI-RS pattern of FIG. 15 is different from the CSI-RS pattern of FIG. 13 in a sense that a resource element allocated for a UE-specific RS of layers 3 and 4 is additionally allocated to 6th and 7th sets for a CSI-RS. The 6th set may include a resource element corresponding to 3rd, 6th, 9th, and 12th subcarriers of 5th and 6th OFDM symbols which are OFDM symbols to which a DRS is mapped. The 7th set may include a resource element corresponding to 2nd, 5th, 8th, and 11th subcarriers of 11th and 12th OFDM symbols which are OFDM symbols to which a DRS is mapped. Accordingly, the number of resource element sets that can be selected by a BS to transmit a CSI-RS increases, and channel estimation performance can be improved by avoiding inter-cell interference (ICI) for a CSI-RS in a multi-cell environment. A CSI-RS for up to 8 antenna ports is transmitted in a resource element constituting each resource element set. A location of a resource element to which a CSI-RS of each antenna port is mapped may change in each resource element set. Further, the CSI-RS can be transmitted by being mapped to a different resource element set for each subframe. The BS can select any one set among the 1st set to the 7th set and can map the CSI-RS to a resource element that constitutes a corresponding resource element set. In this case, the selected set may be selected based on a cell ID, for example, based on the equation of (cell ID mod 7)+1.

Figure 16:
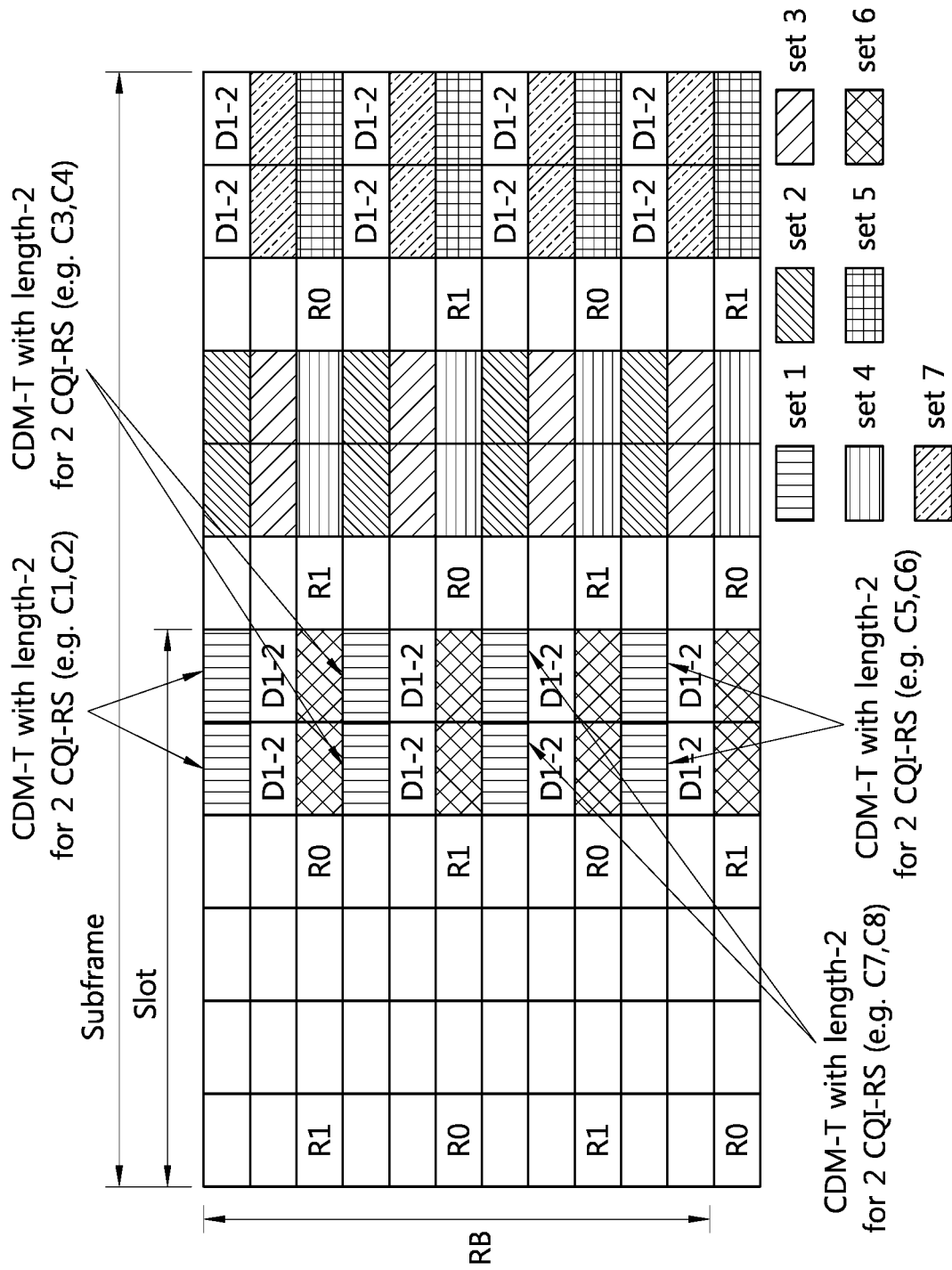

FIG. 16 shows another example of a CSI-RS pattern according to the proposed invention. Referring to FIG. 16, a CSI-RS is transmitted by being mapped to a resource element set configured in the same manner as FIG. 15, except that the CSI-RS for 8 antenna ports are grouped in pair and are CDM-multiplexed along a time domain. Among resource elements included in a 1st set, a CSI-RS for 1st and 2nd antenna ports can be mapped to a resource element included in a 1st subcarrier. A CSI-RS for the 1st and 2nd antenna ports can be CDM-multiplexed along the time domain by using an orthogonal sequence having a length of 2. Since the CSI-RS is CDM-multiplexed along the time domain, it can be said that the CSI-RS is multiplexed in a CDM-T manner. Likewise, among the resource elements included in the 1st set, a CSI-RS for 3rd and 4th antenna ports can be CDM-multiplexed and mapped along the time domain to a resource element included in a 4th subcarrier. In addition, a CSI-RS for 5th and 6th antenna ports and a CSI-RS for 7th and 8th antenna ports can be CDM-multiplexed and mapped along the time domain respectively to a resource element included in a 7th subcarrier and a resource element included in a 10th subcarrier. A CSI-RS of antenna ports which are CDM-multiplexed in the same carrier is not limited to the present embodiment, and thus can be multiplexed by configuring it with various combinations. A location of a resource element to which a CSI-RS of each antenna port is mapped may change in each resource element set. Further, the CSI-RS can be transmitted by being mapped to a different resource element set for each subframe. A BS can select any one set among the 1st set to the 7th set and can map the CSI-RS to a resource element that constitutes a corresponding resource element set. In this case, the selected set may be selected based on a cell ID, for example, based on the equation of (cell ID mod 7)+1.

Figure 17:
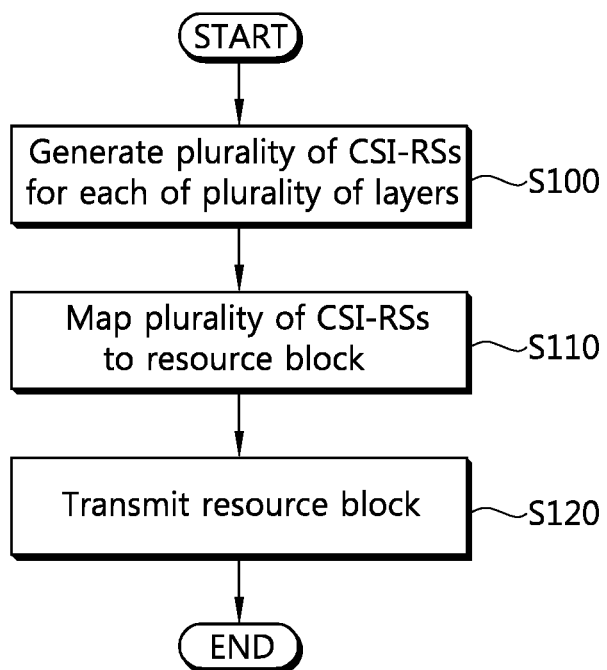
FIG. 17 shows the proposed RS transmission method according to an embodiment of the present invention.

FIG. 17 shows the proposed RS transmission method according to an embodiment of the present invention.

In step S100, a BS generates a plurality of CSI-RSs for each of a plurality of layers. In step S110, the BS maps the plurality of CSI-RSs to a resource block. A resource element in the resource block to which the plurality of CSI-RSs are mapped is a resource element to which a CRS of 3GPP LTE rel-8 and a UE-specific RS are not mapped, and the plurality of CSI-RSs can be mapped by being multiplexed with CDM-T. In step S120, the BS transmits the resource block to which the CSI-RS is mapped.

Figure 18:
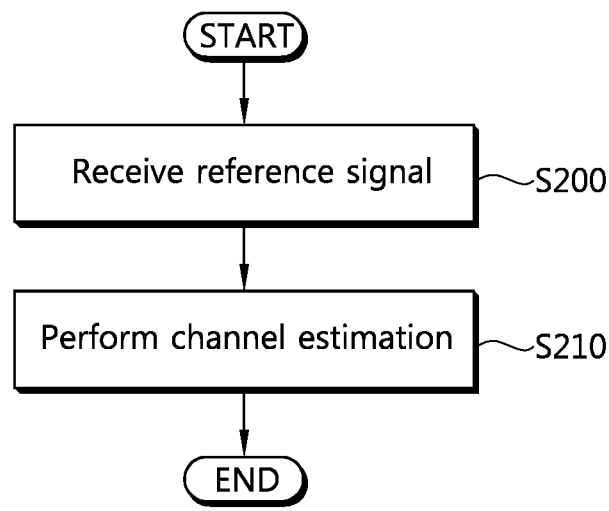
FIG. 18 shows the proposed channel estimation method according to an embodiment of the present invention.

FIG. 18 shows the proposed channel estimation method according to an embodiment of the present invention.

In step S200, a UE receives a plurality of RSs for each of a plurality of layers from a BS. The plurality of RSs may be a CSI-RS of 3GPP LTE-A. In step S210, the UE performs channel estimation by processing the plurality of RSs. A resource element in the resource block to which the plurality of RSs are mapped is a resource element to which a CRS of 3GPP LTE rel-8 and a UE-specific RS are not mapped, and the plurality of CSI-RSs can be mapped by being multiplexed with CDM-T.

Figure 19:
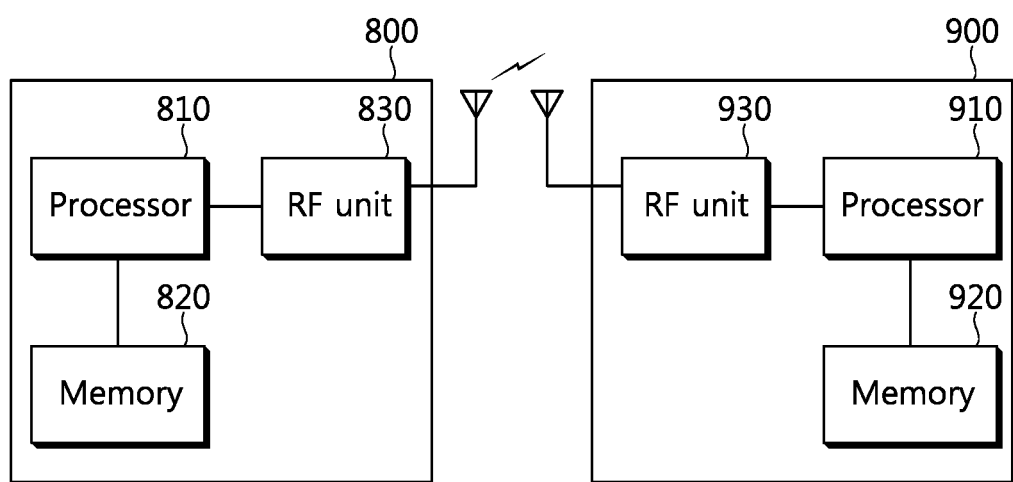
FIG. 19 is a block diagram showing a BS and a UE according to an embodiment of the present invention.

FIG. 19 is a block diagram showing a BS and a UE according to an embodiment of the present invention.

A BS 800 includes a processor 810, a memory 820, and a radio frequency (RF) unit 830. The processor 810 implements the proposed functions, processes, and/or methods. The processor 810 generates a plurality of CSI-RSs for each of a plurality of layers and maps the plurality of CSI-RSs to a resource block. A resource element in the resource block to which the plurality of CSI-RSs are mapped is a resource element to which a CRS of 3GPP LTE rel-8 and a UE-specific RS are not mapped, and the plurality of CSI-RSs can be mapped by being multiplexed with CDM-T. The plurality of CSI-RSs can be mapped according to the RS patterns of FIG. 13 to FIG. 16. Layers of a radio interface protocol can be implemented by the processor 810. The memory 820 coupled to the processor 810 stores a variety of information for driving the processor 810. The RF unit 830 coupled to the processor 810 transmits and/or receives a radio signal, and transmits a resource block to which the plurality of CSI-RSs are mapped.

A UE 900 includes a processor 910, a memory 920, and an RF unit 930. The RF unit 930 coupled to the processor 910 transmits and/or receives a radio signal and receives a plurality of RSs. The plurality of RSs may be a CSI-RS of 3GPP LTE-A. The processor 910 implements the proposed functions, processes, and/or methods. The processor 910 performs channel estimation by processing the plurality of RSs. Layers of a radio interface protocol can be implemented by the processor 910. The memory 920 coupled to the processor 910 stores a variety of information for driving the processor 910.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for a user equipment (UE) in a wireless communication system, the method comprising:
    receiving a channel state information reference signal (CSI-RS) for at one antenna port from a network in a subframe; and
    wherein the CSI-RS is mapped to at least one pair of resource elements (REs) per physical resource block (PRB) pair in consecutive orthogonal frequency division multiplexing (OFDM) symbols in the subframe,
    wherein the subframe includes two slots, and each slot includes six OFDM symbols based on an extended cyclic prefix (CP).

2. The method of claim 1, wherein a number of the at least one antenna port is eight.

3. The method of claim 2, wherein the CSI-RS for eight antenna ports is mapped to four pairs of REs per PRB pair in the consecutive OFDM symbols.

4. The method of claim 3, wherein the four pairs of REs per PRB pair are separated from each other by a constant subcarrier spacing in the consecutive OFDM symbols.

5. The method of claim 4, wherein the constant subcarrier spacing is 3-subcarrier spacing.

6. The method of claim 1, wherein the consecutive OFDM symbols are 2nd and 3rd OFDM symbols in a second slot of the subframe.

7. The method of claim 6, wherein a cell-specific reference signal (CRS) is not transmitted via antenna ports 2 and 3 in the 2nd and 3rd OFDM symbols in the second slot of the subframe.

8. The method of claim 1, wherein the consecutive OFDM symbols are 5th and 6th OFDM symbols in a second slot or 5th and 6th OFDM symbols in a first slot of the subframe.

9. The method of claim 1, wherein the subframe is a downlink (DL) subframe in a time division duplex (TDD) frame.

10. The method of claim 1, further comprising estimating a channel based on the received CSI-RS.

11. A user equipment (UE) in a wireless communication system, the UE comprising:
- at least one transceiver;
- at least one processor; and
- at least one computer memory operably connectable to the at least one processor and storing instructions that, based on being executed by the at least one processor, perform operations comprising:
- receiving a channel state information reference signal (CSI-RS) for at one antenna port from a network in a subframe; and
- wherein the CSI-RS is mapped to at least one pair of resource elements (REs) per physical resource block (PRB) pair in consecutive orthogonal frequency division multiplexing (OFDM) symbols in the subframe,
- wherein the subframe includes two slots, and each slot includes six OFDM symbols based on an extended cyclic prefix (CP).

12. A processor for a wireless device in a wireless communication system, wherein the processor is configured to control the wireless device to perform operations comprising:
- receiving a channel state information reference signal (CSI-RS) for at one antenna port from a network in a subframe; and
- wherein the CSI-RS is mapped to at least one pair of resource elements (REs) per physical resource block (PRB) pair in consecutive orthogonal frequency division multiplexing (OFDM) symbols in the subframe,
- wherein the subframe includes two slots, and each slot includes six OFDM symbols based on an extended cyclic prefix (CP).

* * * * *